(12) United States Patent
Jung et al.

(10) Patent No.: US 12,499,047 B2
(45) Date of Patent: Dec. 16, 2025

(54) ENHANCED READ CACHE FOR STREAM SWITCHING IN STORAGE DEVICE

(71) Applicant: Sandisk Technologies, Inc., Milpitas, CA (US)

(72) Inventors: Sangyun Jung, YongIn (KR); Minwoo Lee, Hwasung (KR); Minyoung Kim, Suwon (KR)

(73) Assignee: Sandisk Technologies, Inc., Milpitas, CA (US)

( * ) Notice: Subject to any disclaimer, the term of this patent is extended or adjusted under 35 U.S.C. 154(b) by 74 days.

(21) Appl. No.: 18/353,035

(22) Filed: Jul. 14, 2023

(65) Prior Publication Data

US 2024/0256455 A1     Aug. 1, 2024

Related U.S. Application Data

(60) Provisional application No. 63/442,084, filed on Jan. 30, 2023.

(51) Int. Cl.
*G06F 12/0862*        (2016.01)

(52) U.S. Cl.
CPC ................. *G06F 12/0862* (2013.01)

(58) Field of Classification Search
CPC .......... G06F 12/0862; G06F 12/0868
See application file for complete search history.

(56) References Cited

U.S. PATENT DOCUMENTS

| | | | | |
|---|---|---|---|---|
| 2005/0253858 | A1* | 11/2005 | Ohkami | G06F 12/0862 345/531 |
| 2008/0320228 | A1* | 12/2008 | Brunheroto | G06F 12/0862 711/137 |
| 2020/0285582 | A1* | 9/2020 | Palmer | G06F 12/0868 |
| 2021/0248094 | A1* | 8/2021 | Norman | G06F 9/4403 |
| 2023/0060194 | A1* | 3/2023 | Retter | G06F 3/0604 |

* cited by examiner

*Primary Examiner* — Prasith Thammavong
*Assistant Examiner* — Edmund H Kwong
(74) *Attorney, Agent, or Firm* — Morgan, Lewis & Bockius LLP

(57) ABSTRACT

In a data storage device, a controller can efficiently allocate a limited cache space to service multiple data streams. In one or more examples, in response to receiving a first read command for a first stream, the controller may respond to read commands for the first stream based on prefetching data for the first stream using buffers. When the controller receives a second read command for a second stream, the controller may respond to read commands based on prefetching data for the first stream and the second stream using the buffers. After receiving the second read command, in response to receiving a number of read commands for the first stream, the controller may cease prefetching data for the second stream using the buffers, and revert to responding to read commands for the first stream based on prefetching data for the first stream using the buffers.

20 Claims, 12 Drawing Sheets

ENHANCED READ CACHE FOR STREAM SWITCHING IN STORAGE DEVICE

CROSS-REFERENCE TO RELATED APPLICATION

This application claims the benefit of U.S. Provisional Application No. 63/442,084, filed on Jan. 30, 2023, the entirety of which is incorporated herein by reference for all purposes.

BACKGROUND

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), secure digital (SD) cards, and the like. A flash storage device may store control information associated with data. For example, a flash storage device may maintain control tables that include a mapping of logical addresses to physical addresses. This control tables are used to track the physical location of logical sectors, or blocks, in the flash memory. The control tables are stored in the non-volatile memory to enable access to the stored data after a power cycle.

A storage device may provide one or more streams to one or more hosts. To improve performance, portions of the one or more streams may be stored in a read cache. However, the read cache may have limited space, and thus the read cache may be allocated to one or more streams. With the limited cache space, when additional streams are requested, the storage device may not effectively allocate cache space to service the additional streams. This may result in performance degradation or inefficient use of the read cache.

The description provided in the background section should not be assumed to be prior art merely because it is mentioned in or associated with the background section. The background section may include information that describes one or more aspects of the subject technology, and the description in this section does not limit the invention.

BRIEF DESCRIPTION OF THE DRAWINGS

A detailed description will be made with reference to the accompanying drawings.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology may be practiced without these specific details. In some instances, structures and components are shown in block diagram form in order to avoid obscuring the concepts of the subject technology. Like components are labeled with identical element numbers for ease of understanding.

The present description relates in general to data storage systems and methods, and more particularly to, for example, without limitation, providing enhanced read cache for stream switching in a data storage device.

Figure 1:
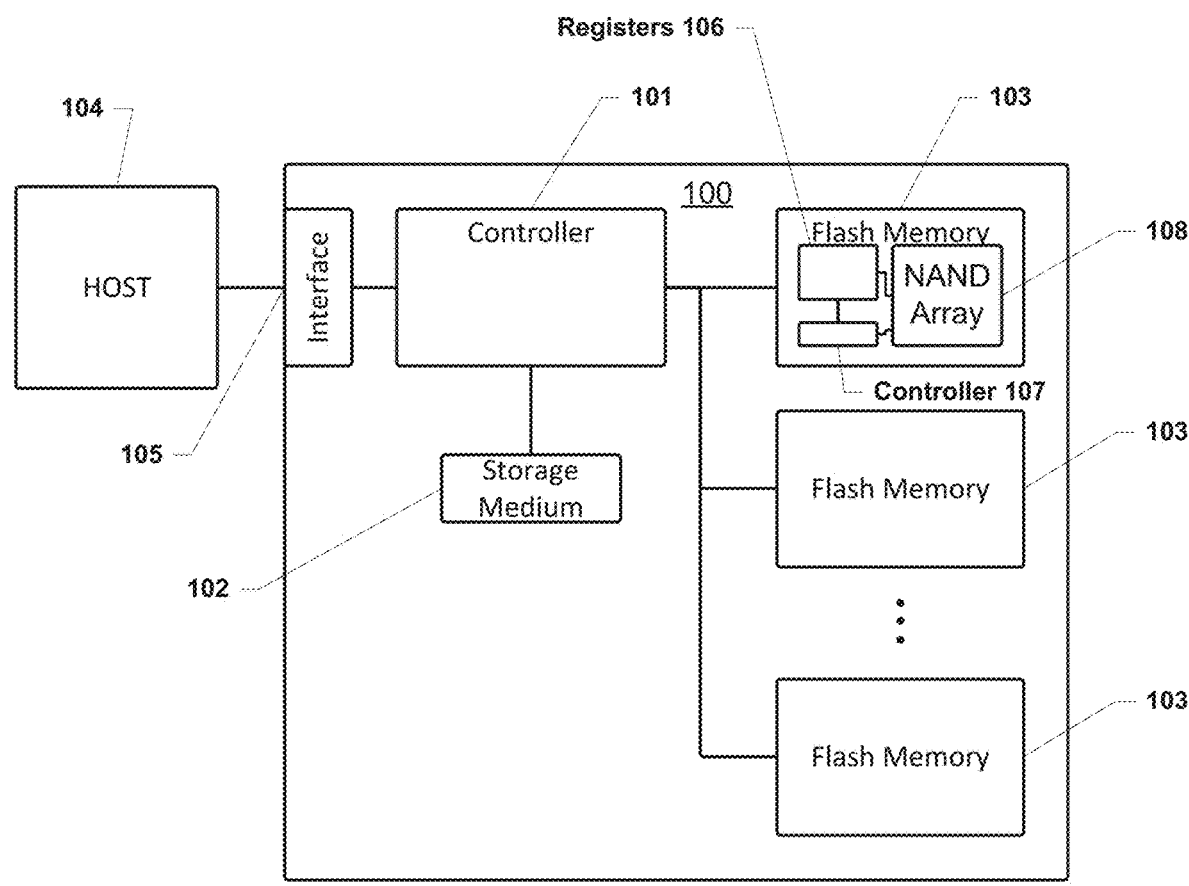
FIG. 1 is a block diagram illustrating components of an example data storage system, according to one or more embodiments.

FIG. 1 is a block diagram illustrating components of an example data storage system, according to aspects of the subject technology. A data storage system may be sometimes referred to as a system, a data storage device, a storage device, or a device. As depicted in FIG. 1, in some aspects, a data storage system 100 (e.g., a solid-state drive (SSD)) includes a data storage controller 101, a storage medium 102, and a flash memory array including one or more flash memory 103. The controller 101 may use the storage medium 102 for temporary storage of data and information used to manage the data storage system 100. The controller 101 may include several internal components (not shown), such as a read-only memory, other types of memory, a flash component interface (e.g., a multiplexer to manage instruction and data transport along a serial connection to the flash memory 103), an input/output (I/O) interface, error correction circuitry, and the like. In some aspects, the elements of the controller 101 may be integrated into a single chip. In other aspects, these elements may be separated on their own personal computer (PC) board.

In some implementations, aspects of the subject disclosure may be implemented in the data storage system 100. For example, aspects of the subject disclosure may be integrated with the function of the data storage controller 101 or may be implemented as separate components for use in conjunction with the data storage controller 101.

The controller 101 may also include a processor that may be configured to execute code or instructions to perform the operations and functionality described herein, manage request flow and address mappings, and to perform calculations and generate commands. The processor of the controller 101 may be configured to monitor and/or control the operation of the components in the data storage controller 101. The processor may be a microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on read-only-memory (ROM) within the controller 101 and/or its processor. One or more sequences of instructions may be software stored and read from the storage medium 102, the flash memory 103, or received from a host device 104 (e.g., via a host interface 105). ROM, the storage medium 102, the flash memory 103, represent examples of machine or computer readable media on which instructions/code executable by the controller 101 and/or its processor may be stored. Machine or computer readable media may generally refer to any medium or media used to provide instructions to the controller 101 and/or its processor, including volatile media, such as dynamic memory used for the storage media 102 or for buffers within the controller 101, and non-volatile media, such as electronic media, optical media, and magnetic media.

In some aspects, the controller 101 may be configured to store data received from the host device 104 in the flash memory 103 in response to a write command from the host device 104. The controller 101 is further configured to read data stored in the flash memory 103 and to transfer the read data to the host device 104 in response to a read command from the host device 104. A host device 104 may be sometimes referred to as a host, a host system, or a host computer.

The host device 104 represents any device configured to be coupled to the data storage system 100 and to store data in the data storage system 100. The host device 104 may be a computing system such as a personal computer, a server, a workstation, a laptop computer, a personal digital assistant (PDA), a smart phone, or the like. Alternatively, the host device 104 may be an electronic device such as a digital camera, a digital audio player, a digital video recorder, or the like.

In some aspects, the storage medium 102 represents volatile memory used to temporarily store data and information used to manage the data storage system 100. According to aspects of the subject technology, the storage medium 102 is random access memory (RAM), such as double data rate (DDR) RAM. Other types of RAMs may be also used to implement the storage medium 102. The memory 102 may be implemented using a single RAM module or multiple RAM modules. While the storage medium 102 is depicted as being distinct from the controller 101, those skilled in the art will recognize that the storage medium 102 may be incorporated into the controller 101 without departing from the scope of the subject technology. Alternatively, the storage medium 102 may be a non-volatile memory, such as a magnetic disk, flash memory, peripheral SSD, and the like.

As further depicted in FIG. 1, the data storage system 100 may also include the host interface 105. The host interface 105 may be configured to be operably coupled (e.g., by wired or wireless connection) to the host device 104, to receive data from the host device 104 and to send data to the host device 104. The host interface 105 may include electrical and physical connections, or a wireless connection, for operably coupling the host device 104 to the controller 101 (e.g., via the I/O interface of the controller 101). The host interface 105 may be configured to communicate data, addresses, and control signals between the host device 104 and the controller 101. Alternatively, the I/O interface of the controller 101 may include and/or be combined with the host interface 105. The host interface 105 may be configured to implement a standard interface, such as a small computer system interface (SCSI), a serial-attached SCSI (SAS), a fibre channel interface, a peripheral component interconnect express (PCIe), a serial advanced technology attachment (SATA), a universal serial bus (USB), or the like. The host interface 105 may be configured to implement only one interface. Alternatively, the host interface 105 (and/or the I/O interface of controller 101) may be configured to implement multiple interfaces, which may be individually selectable using a configuration parameter selected by a user or programmed at the time of assembly. The host interface 105 may include one or more buffers for buffering transmissions between the host device 104 and the controller 101. The host interface 105 (or a front end of the controller 101) may include a submission queue 110 to receive commands from the host device 104. For input-output (I/O), the host device 104 may send commands, which may be received by the submission queue 110 (e.g., a fixed size circular buffer space). In some aspects, the submission queue may be in the controller 101. In some aspects, the host device 104 may have a submission queue. The host device 104 may trigger a doorbell register when commands are ready to be executed. The controller 101 may then pick up entries from the submission queue in the order the commands are received, or in an order of priority.

The flash memory 103 may represent a non-volatile memory device for storing data. According to aspects of the subject technology, the flash memory 103 includes, for example, a not-and (NAND) flash memory. The flash memory 503 may include a single flash memory device or chip, or (as depicted in FIG. 1) may include multiple flash memory devices or chips arranged in multiple channels. The flash memory 103 is not limited to any capacity or configuration. For example, the number of physical blocks, the number of physical pages per physical block, the number of sectors per physical page, and the size of the sectors may vary within the scope of the subject technology.

The flash memory may have a standard interface specification so that chips from multiple manufacturers can be used interchangeably (at least to a large degree). The interface hides the inner working of the flash and returns only internally detected bit values for data. In aspects, the interface of the flash memory 103 is used to access one or more internal registers 106 and an internal flash controller 107 for communication by external devices (e.g., the controller 101). In some aspects, the registers 106 may include address, command, and/or data registers, which internally retrieve and output the necessary data to and from a NAND memory cell array 108. A NAND memory cell array 108 may be sometimes referred to as a NAND array, a memory array, or a NAND. For example, a data register may include data to be stored in the memory array 108, or data after a fetch from the memory array 108 and may also be used for temporary data storage and/or act like a buffer. An address register may store the memory address from which data will be fetched to the host device 104 or the address to which data will be sent and stored. In some aspects, a command register is included to control parity, interrupt control, and the like. In some aspects, the internal flash controller 107 is accessible via a control register to control the general behaviour of the flash memory 103. The internal flash controller 107 and/or the control register may control the number of stop bits, word length, receiver clock source, and may also control switching the addressing mode, paging control, coprocessor control, and the like.

In some aspects, the registers 106 may also include a test register. The test register may be accessed by specific addresses and/or data combinations provided at the interface of flash memory 103 (e.g., by specialized software provided by the manufacturer to perform various tests on the internal components of the flash memory). In further aspects, the test register may be used to access and/or modify other internal registers, for example the command and/or control registers. In some aspects, test modes accessible via the test register may be used to input or modify certain programming conditions of the flash memory 103 (e.g., read levels) to dynamically vary how data is read from the memory cells of the memory arrays 108. The registers 106 may also include one or more data latches coupled to the flash memory 103.

It should be understood that in all cases data may not always be the result of a command received from the host 104 and/or returned to the host 104. In some aspects, the controller 101 may be configured to execute a read operation independent of the host 104 (e.g., to verify read levels or BER). The predicate words "configured to," "operable to," and "programmed to" as used herein do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The controller 101 may perform the operations identified in blocks 802-810. The controller 101 may cause the operations identified in blocks 802-810 to occur, or the controller 101 may provide instructions to cause or facilitate the controller 107 (and the registers 106) to perform operations identified in blocks 802-810.

In some aspects, the controller 101 may include a read cache (sometimes referred to as a tiny read cache). A read cache may be a buffer. In one or more examples, the read cache may be, may include, or may be part of, a RAM or a static RAM (SRAM). In one or more examples, the controller 101 and/or the storage medium 102 may include the read cache. The read cache may include one or more read caches. In one or more examples, a read cache is not located within the flash memory 103. In one or more examples, the read cache is not located in the interface 105. In one or more examples, the read cache may be distinct and separate from encoding/decoding buffers (e.g., in the controller 101 or the storage medium 102) utilized while encoding data to be written to the flash memory 103 or decoding data read from the flash memory 103. Encoding and decoding may include hard and soft encoding and hard and soft decoding. A hardware driven data path may include a path of reading data from a NAND array 108, to a latch, to a decoding buffer (e.g., in the controller 101 or the storage medium 102) for decoding the read data, to a buffer in the interface 105, and then to the host 104. The hardware driven data path does not include a read cache. In one or more examples, a firmware interrupted data path may include a path of reading data from a NAND array 108, to a latch, to a read cache, to a decoding buffer (e.g., in the controller 101 or the storage medium 102) for decoding the read data, to a buffer in the interface 105, and then to the host 104. In one or more other examples, a firmware interrupted data path may include a path of reading data from a NAND array 108, to a latch, to a decoding buffer (e.g., in the controller 101 or the storage medium 102) for decoding the read data, to a read cache, to a buffer in the interface 105, and then to the host 104.

Tiny read caches may be used for handling stream data. Some embodiments may handle repetitive logical block address access in a multi-stream state. In order to activate a tiny read cache, the following two main conditions may need to be satisfied: (i) memory access may be of a predetermined size (e.g., 4 Kilobyte (KB) size) and a predetermined aligned logical block address (e.g., 4 KB logical block address), and (ii) a first unit (e.g., a first 4 KB) of each stream. A tiny read cache may have two (or more) predetermined size (e.g., 4 KB size) buffers. When the tiny read cache is activated, one buffer may contain data requested by a host and the other buffer may prefetch the next predetermined size (e.g., 4 KB size) data until the tiny read cache is deactivated. In order to be activated again in the state of de-activation, the activation condition may need to be satisfied. The tiny read cache algorithm described herein may continue to operate when a stream is switched and accessed in a multi-stream state.

Figure 2:
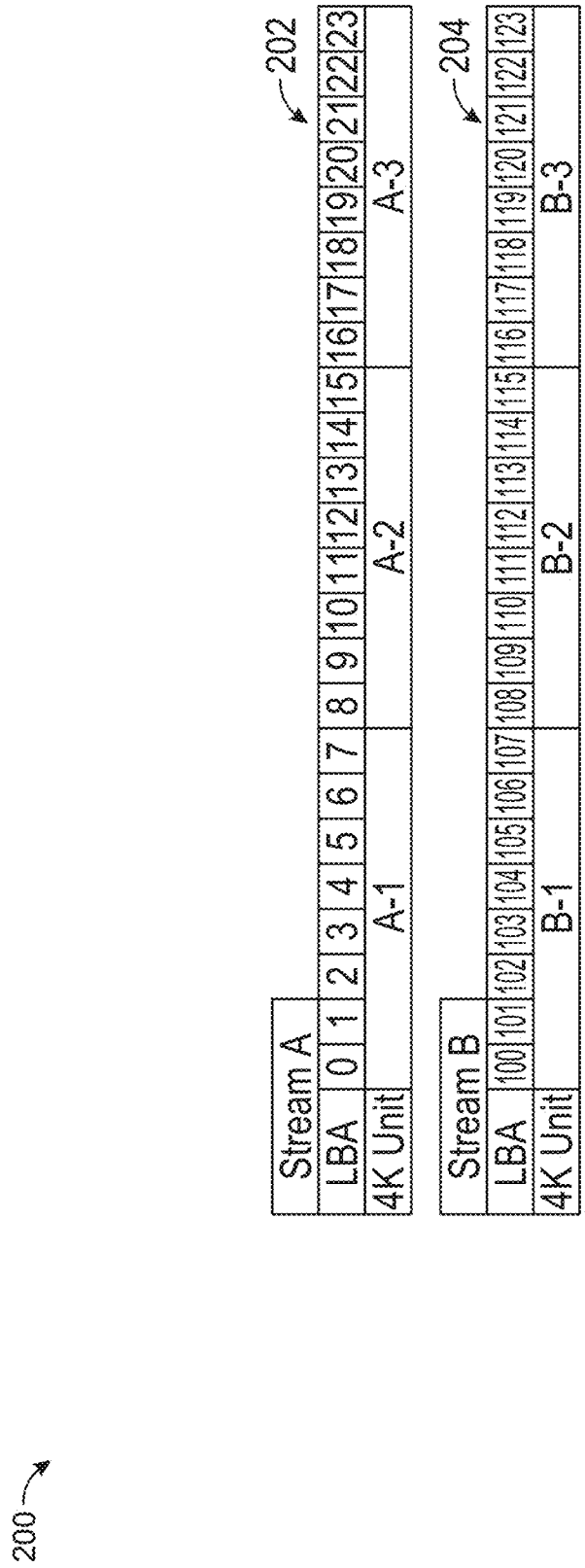
FIG. 2 is a schematic diagram of an example multi-stream state with two streams of data, according to one or more embodiments.

FIG. 2 is a schematic diagram of an example multi-stream state 200 with two streams of data, according to one or more embodiments. A stream A indicated by label 202 includes 4 Kilobyte (KB) units A-1, A-2 and A-3. The unit A-1 corresponds to logical block addresses 0 through 7, the unit A-2 corresponds to logical block addresses 8 through 15, and the unit A-3 corresponds to logical block addresses 16 through 23. A stream B indicated by label 204 includes 4 KB units B-1, B-2 and B-3. The unit B-1 corresponds to logical block addresses 100 through 107, the unit B-2 corresponds to logical block addresses 108 through 115, and the unit B-3 corresponds to logical block addresses 116 through 123.

Suppose read commands (e.g., 4 KB read commands) are issued in the following order: A-1→A-1→ . . . repetitive A-1→A-2→B-1→A-2→A-2→ . . . .

Figure 3A:
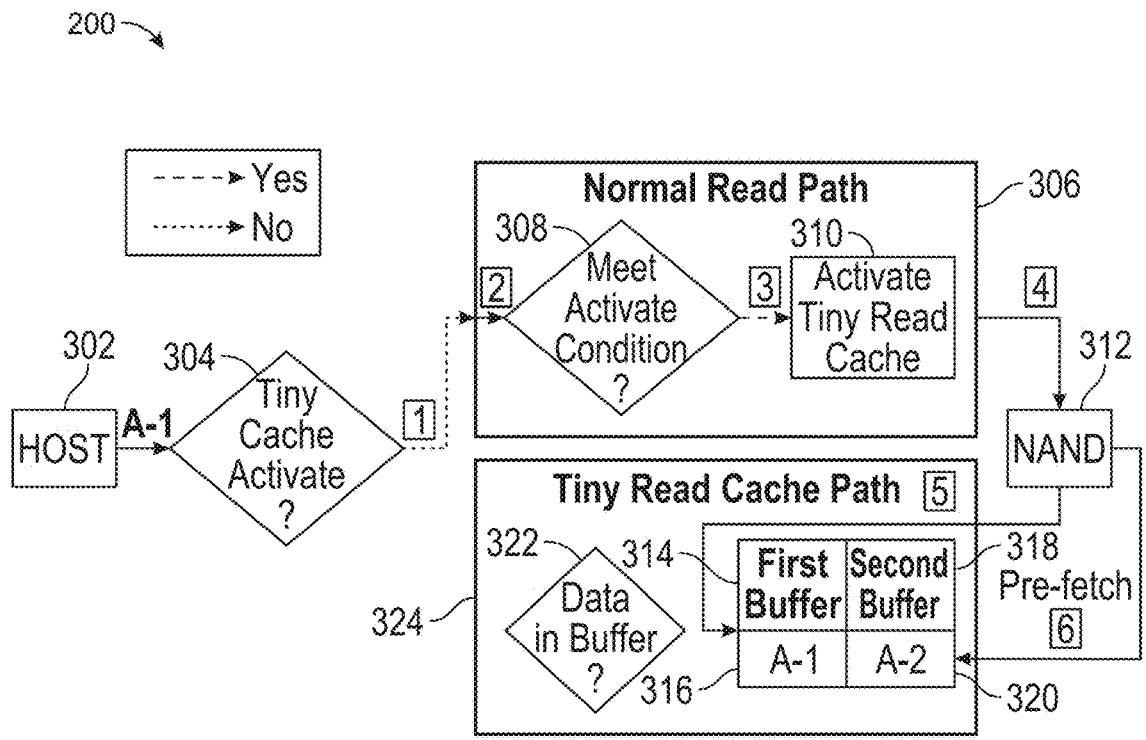
FIGS. 3A-3F shows examples of read command handling, according to one or more embodiments.

FIG. 3A shows read command handling for the first A-1, according to one or more embodiments. A host 302 may issue a first A-1 read command. The controller 101 may determine (304) if a tiny read cache is in an activation state. Initially, the tiny cache may be in a de-activation state. The first A-1 read command may follow a normal read path 306 (along path labelled 1) because the tiny read cache is in the de-activation state. Subsequently, the controller 101 may determine (308), along path labelled 2, if tiny read cache activation condition is satisfied. Since memory access is of a predetermined size (e.g., 4 Kilobyte (KB) size) and the memory access is for a predetermined aligned logical block address (e.g., 4 KB logical block address) corresponding to A-1, and because the read command is for the first unit (i.e., the first A-1) of stream A, tiny read cache is activated (310) along path labelled 3. Data for the first A-1 is accessed from a NAND 312 (as shown along path labelled 4). Subsequently, as shown along path labelled 5, A-1 data 316 requested by the host 302 is loaded in a first buffer 314, and A-2 data 320 is prefetched into a second buffer 318.

Figure 3B:
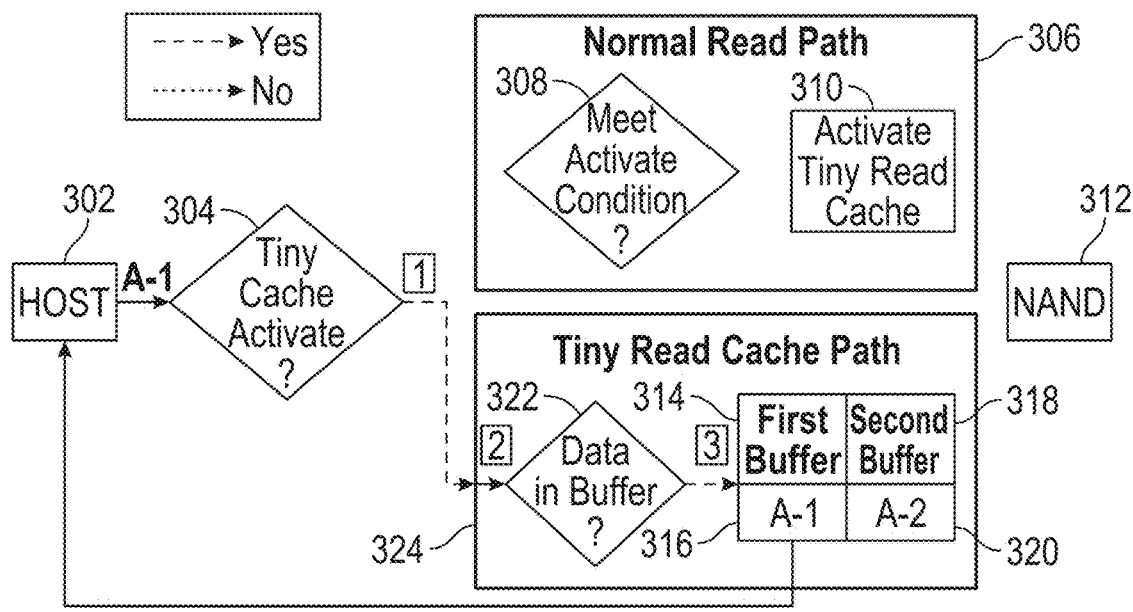

FIG. 3B shows read command handling for the second A-1, according to one or more embodiments. When A-1 read is requested again, as is the case with the second A-1, data is already uploaded to the tiny read cache, so data may be transmitted to the host without NAND operation. Here, the data 316 for A-1 from the first buffer 314 may be returned to the host 302, along the path labelled 1, 2 and 3, after the controller determines (322) that the data for A-1 is in the first buffer 314.

Figure 3C:
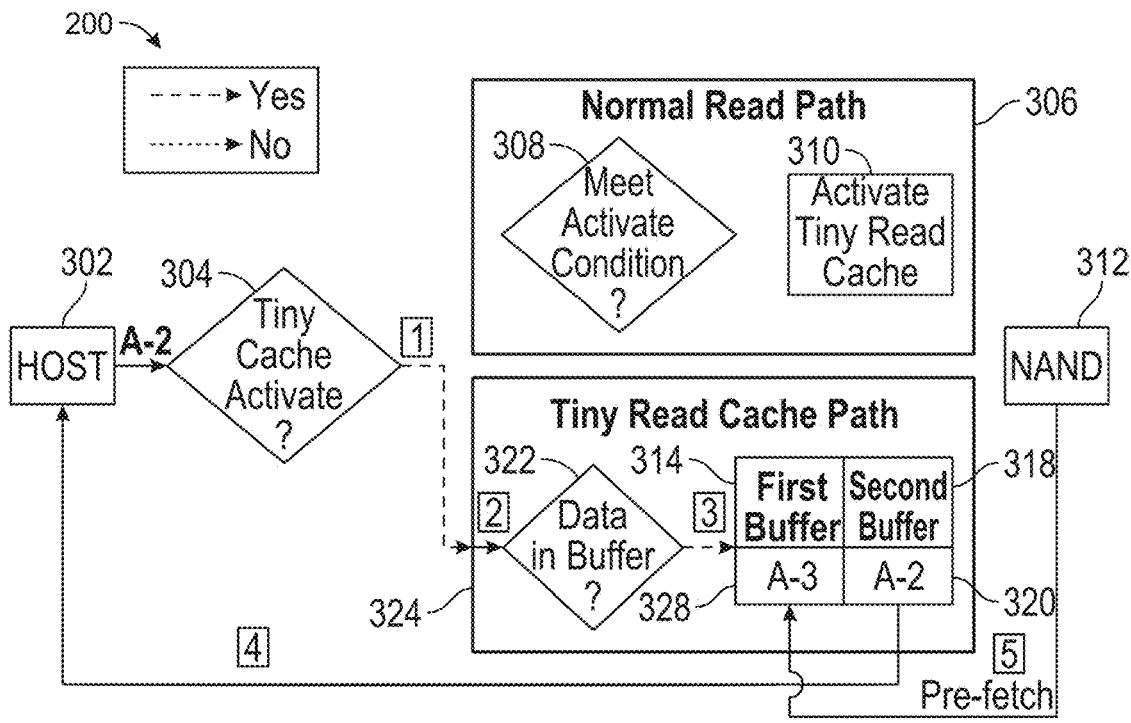

FIG. 3C shows read command handling for a first A-2 after repetitive A-1 access (as described above in reference to FIGS. 3A and 3B), according to one or more embodiments. When A-2 read is requested by the host 302, tiny cache may be in the activated state (path labeled 1), data for A-2 may be determined (322) to be in the second buffer 318 (along path labelled 3). So the data 320 may be transferred to the host 302 without NAND operation because the data has already been pre-fetched, and A-3 data 328 is prefetched to the buffer 314 at the same time.

Figure 3D:
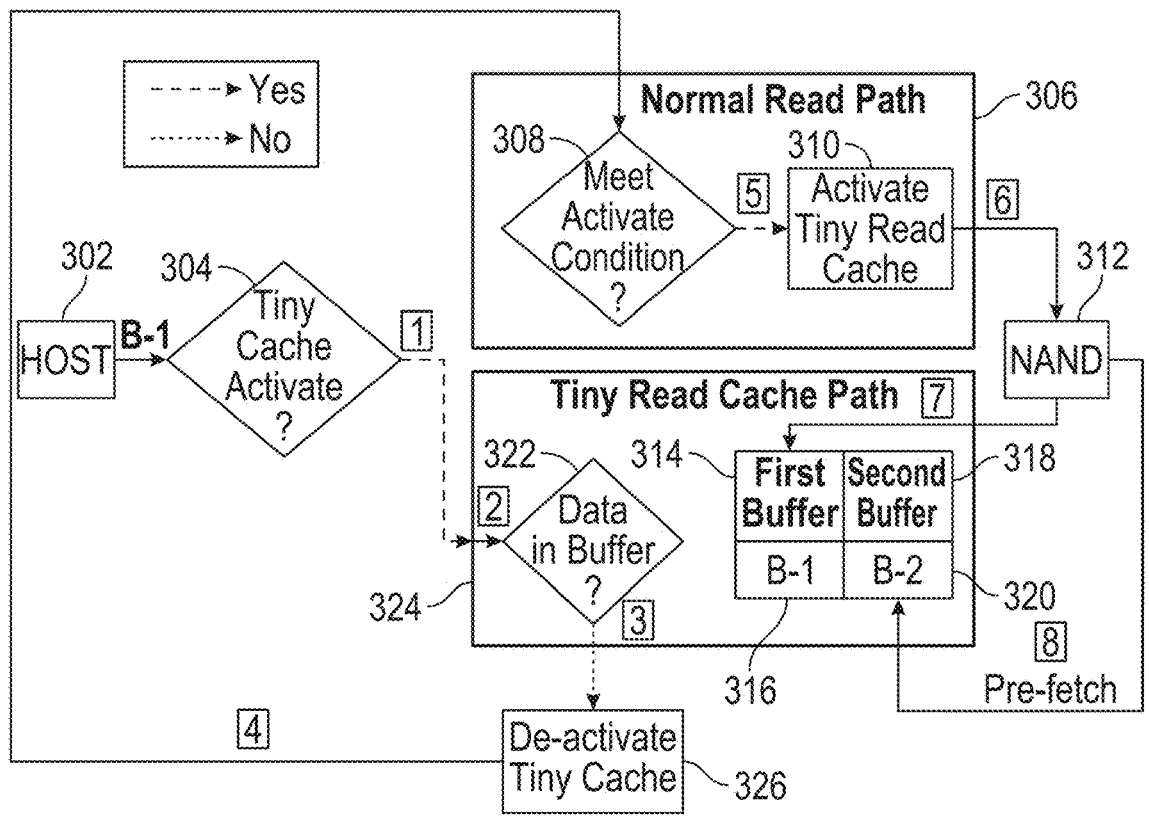

FIG. 3D shows read command handling for B-1, according to one or more embodiments. When the host 302 requests to read B-1 of stream B, the tiny read cache may be in an activated state (paths labelled 1 and 2). But data for stream B is not in the buffers 314 and 318, so the tiny read cache may be de-activated (326, along path labelled 3). Then, the condition to activate the tiny read cache may be checked again (308, path labelled 4), and since the activation condition (first 4 KB of stream B) is satisfied (path labelled 5), the tiny read cache is activated (310) (path labelled 6), and the buffer is filled from NAND (indicated by the paths labelled 7 and 8).

Figure 3E:
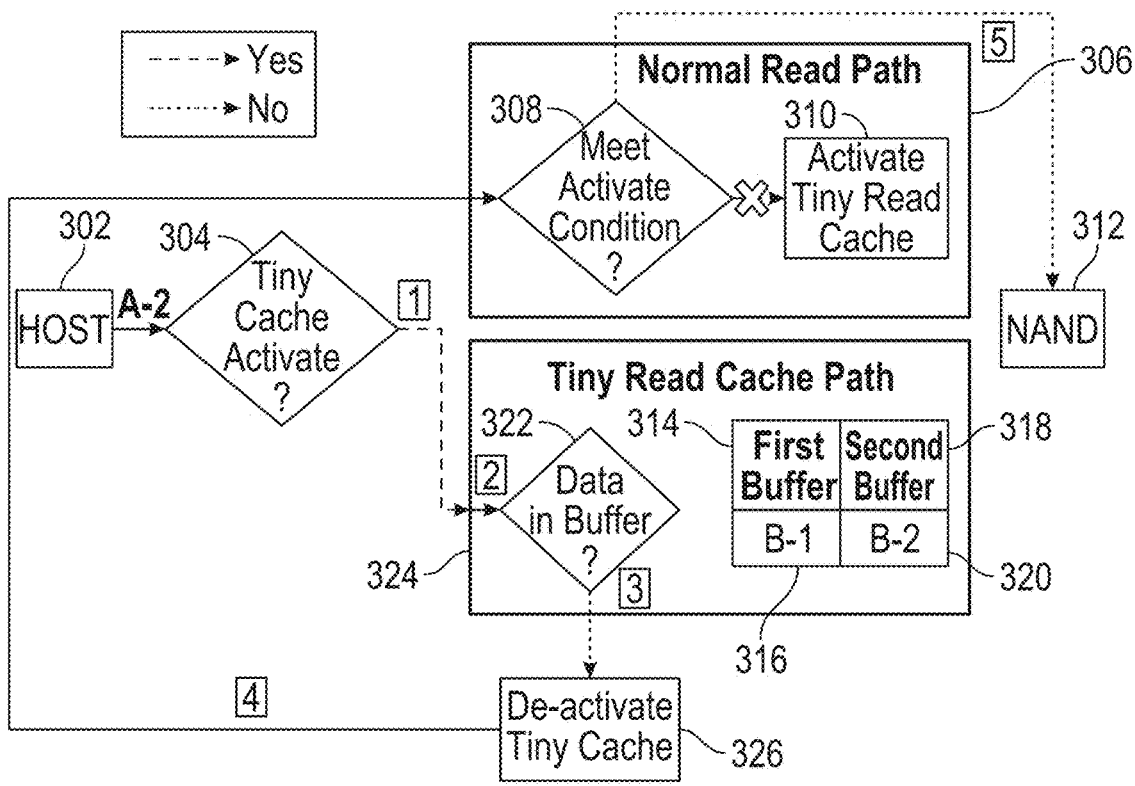

FIG. 3E shows read command handling for A-2, according to one or more embodiments. This example corresponds to an instance when the host 302 returns to stream A again and requests A-2. Since A-2 is not in the buffers, the tiny read cache is de-activated again (326). Then, the activation condition is checked again (308). However, since A-2 read is not the first 4 KB of the stream A, the tiny read cache is not activated (shown by the X mark following the block 308).

Figure 3F:
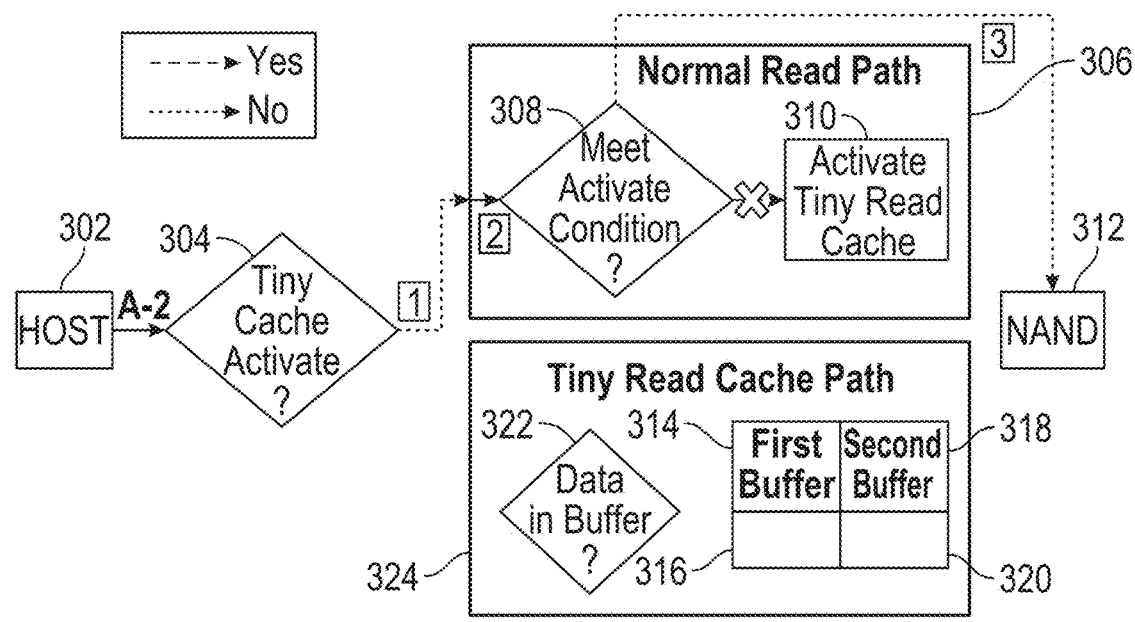

FIG. 3F shows following A-2 read handling, according to one or more embodiments. Subsequent reads of stream A follow the normal read path 306 because tiny read cache may not be activated. Until the first 4 KB read of the stream (i.e., A-1) comes in, the tiny read cache may remain in a de-activation state. This may result in performance drop because of NAND operation instead of using tiny cache buffers.

Figure 4A:
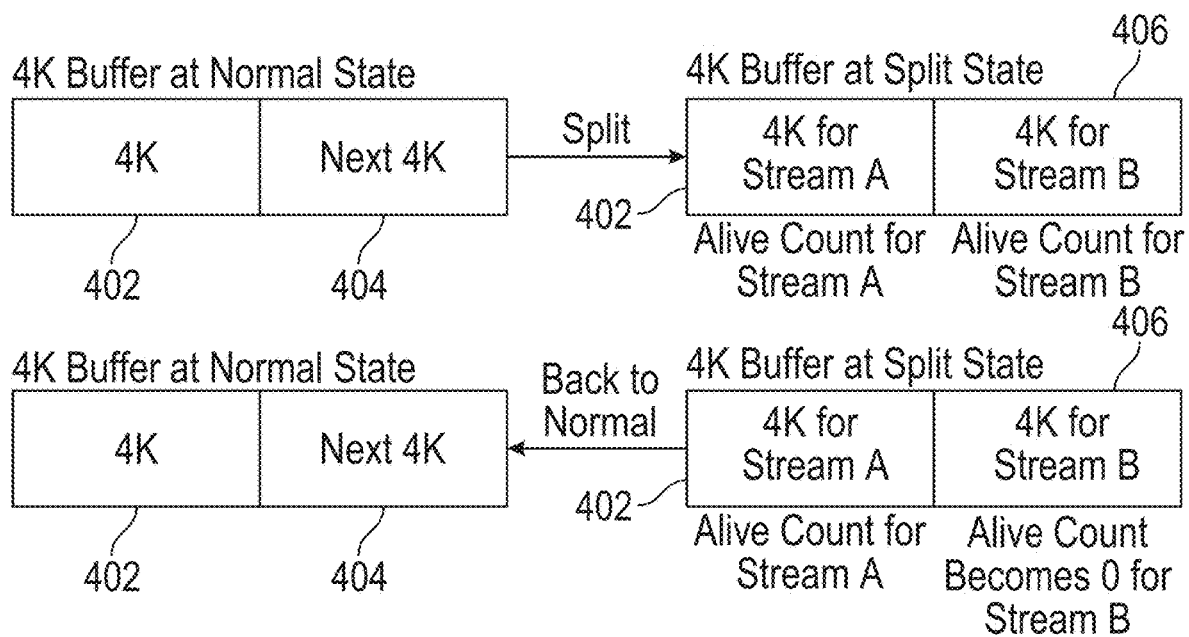
FIGS. 4A and 4B are schematic diagrams for an enhanced algorithm for managing tiny read cache buffers, according to one or more embodiments.
Figure 4B:
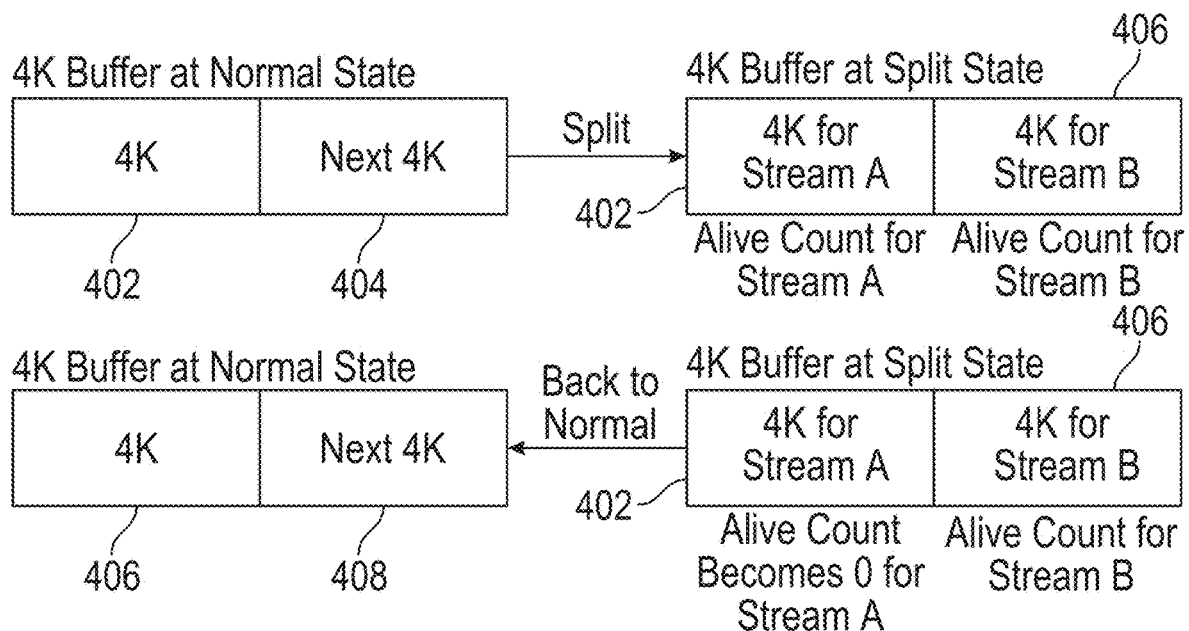

FIGS. 4A and 4B are schematic diagrams for an enhanced algorithm for managing the tiny read cache buffers, according to one or more embodiments. The enhanced algorithm may provide fast response without de-activation of tiny read cache in a multi-stream state. Some embodiments may split two buffers (e.g., two 4 KB buffers) to support each stream. When two streams are accessed simultaneously, the controller may not know which stream the host will access continuously. Therefore, in the split state, the controller 101 may maintain an alive count for each buffer. The alive count manages which streams will survive. If the opponent's stream is continuously accessed, the alive count becomes 0. The controller 101 then may disable the split buffer state, and the buffer may return to the normal state to support the surviving stream.

FIG. 4A shows an instance where the stream A survives, and FIG. 4B shows an instance where the stream B survives. In FIG. 4A, the buffers are initially in a normal state. The buffers may include a 4 KB buffer 402 and another 4 KB buffer 404. Suppose each buffer stores data for stream A. Further suppose that a read command for stream B is requested by the host. The controller 101 may split the buffers (sometimes referred to as a split buffer state). The first buffer may be associated with the 4 KB unit 402 for stream A as before, but the second buffer may be now associated with a 4 KB unit 406 for stream B. An alive count may be associated with each buffer, for each stream. Further suppose that the host sends read commands for stream A, but none for stream B, for a predetermined number of times (the maximum value of the alive count for a stream). The alive count becomes 0 for stream B. The controller 101 may return the buffers to the normal state. FIG. 4B corresponds to a situation when the host sends read commands for stream B, but none for stream A, for a predetermined number of times (the maximum value of the alive count for a stream). The alive count becomes 0 for stream A. The controller 101 may return the buffers to the normal state, for stream B.

Figures 5, 6:
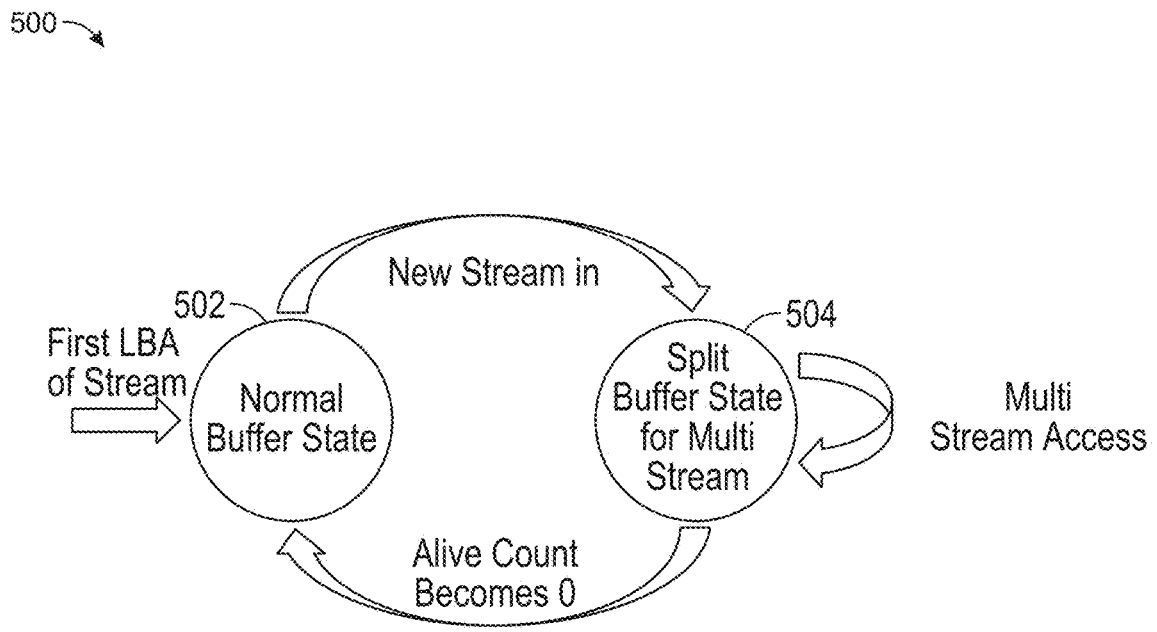
FIG. 5 shows a schematic diagram for an example state machine for buffer management, according to one or more embodiments.
FIG. 6 is a schematic diagram of an example multi-stream state with two streams of data, according to one or more embodiments.

FIG. 5 shows a schematic diagram for an example state machine 500 for buffer management, according to one or more embodiments. The state machine may include two states—a normal buffer state 502 and a split buffer state 504 for multiple streams. When a first logical block address (LBA) of a stream is received by the controller 101, the buffers may be initialized to be in the normal buffer state 502. When a new stream arrives, the controller 101 may switch the state of the buffers to the split buffer state 504 for multiple streams. Multiple streams may be accessed in this state. When alive count becomes 0, for a stream, the controller 101 may return the buffer state to the normal state 502 for the opponent stream.

FIGS. 6 and 7A-7G are used to illustrate an example application of the enhanced algorithm described above, according to one or more embodiments.

FIG. 6 is a schematic diagram of an example multi-stream state 600 with two streams of data, according to one or more embodiments. A stream A indicated by label 602 includes 4 Kilobyte (KB) units A-1, A-2 and A-3. The unit A-1 corresponds to logical block addresses 0 through 7, the unit A-2 corresponds to logical block addresses 8 through 15, and the unit A-3 corresponds to logical block addresses 16 through 23. A stream B indicated by label 604 includes 4 KB units B-1, B-2 and B-3. The unit B-1 corresponds to logical block addresses 100 through 107, the unit B-2 corresponds to logical block addresses 108 through 115, and the unit B-3 corresponds to logical block addresses 116 through 123.

Suppose read commands (e.g., 4 KB read commands) are issued in the following order: A-1→A-1→ . . . repetitive A-1→A-2→B-1→A-2→A-2→ . . . .

Figure 7A:
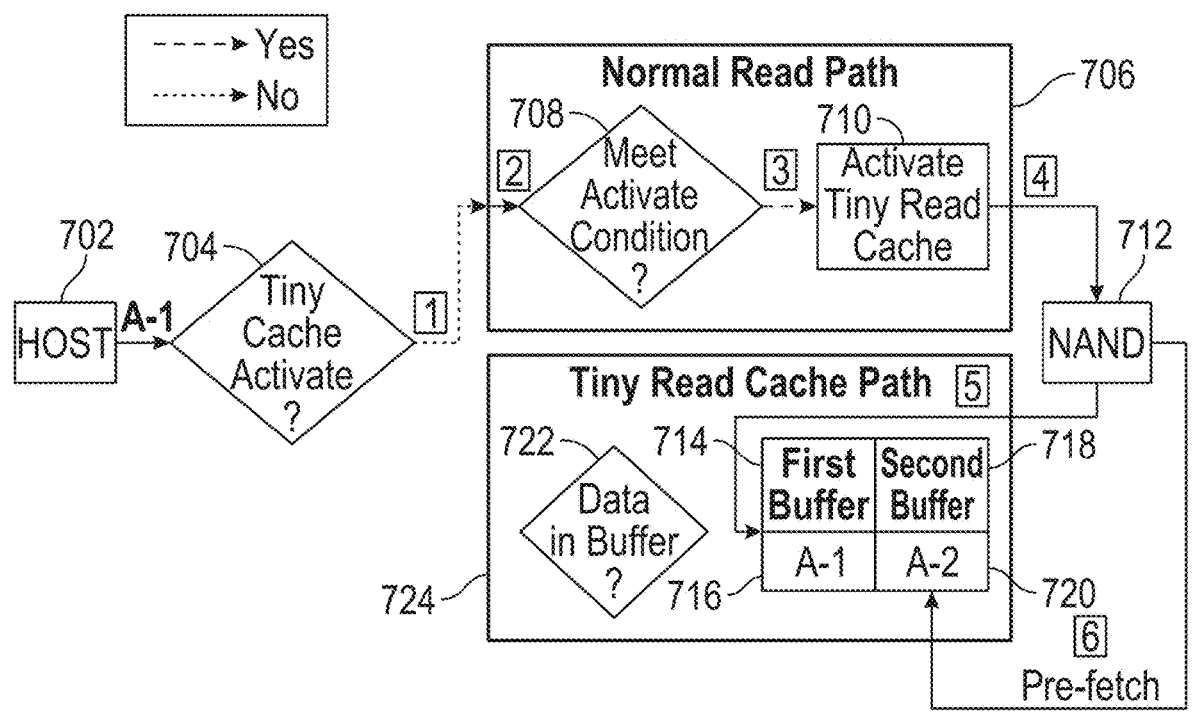
FIG. 7A-7G shows examples of read command handling using tiny read cache buffers, according to one or more embodiments.

FIG. 7A shows read command handling for the first A-1, according to one or more embodiments. A host 702 may issue a first A-1 read command. The controller 101 may determine (704) if a tiny read cache is in an activation state. Initially, the tiny cache may be in a de-activation state. The first A-1 read command may follow a normal read path 706 (along path labelled 1) because the tiny read cache is in the de-activation state. Subsequently, the controller 101 may determine (708), along path labelled 2, if tiny read cache activation condition is satisfied. Since memory access is of a predetermined size (e.g., 4 Kilobyte (KB) size) and the memory access is for a predetermined aligned logical block address (e.g., 4 KB logical block address) corresponding to A-1, and because the read command is for the first unit (i.e., the first A-1) of stream A, tiny read cache is activated (710) along the path labelled 3. Data for the first A-1 is accessed from a NAND 712 (as shown along path labelled 4). Subsequently, as shown along path labelled 5, A-1 data 716 requested by the host 702 is loaded in a first buffer 314, and A-2 data 320 is prefetched into a second buffer 718. This example is similar to the one described above in reference to FIG. 3A. The data requested by the host is loaded into the first buffer and pre-fetched data is loaded into the second buffer.

Figure 7B:
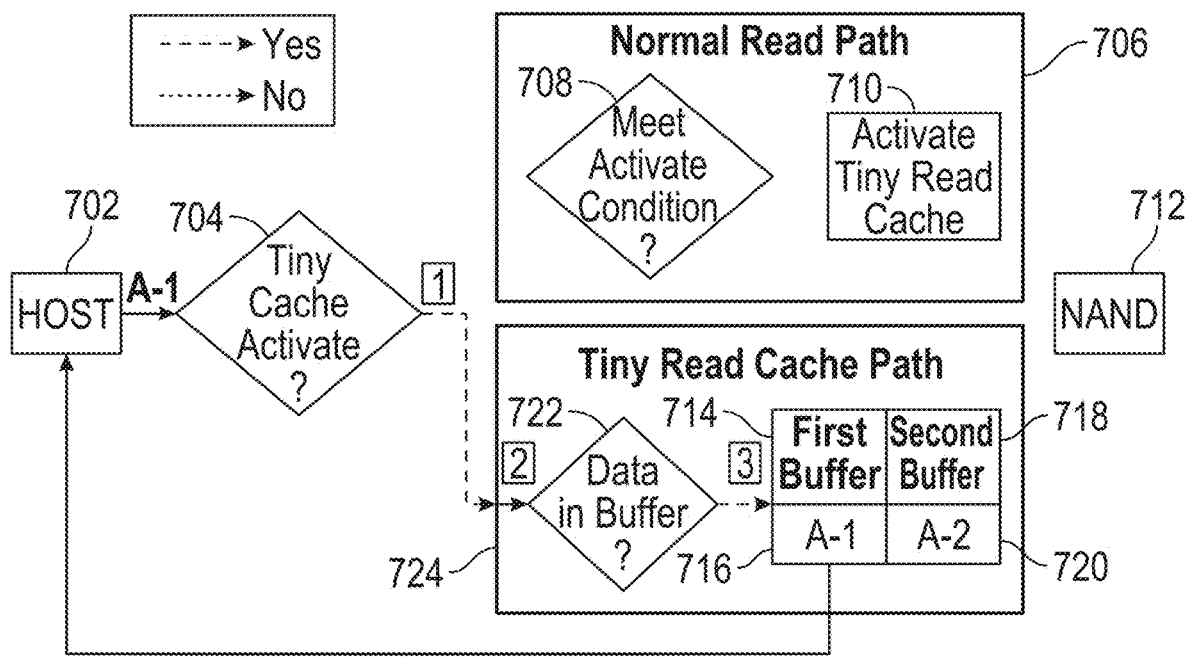

FIG. 7B shows read command handling for the second A-1, according to one or more embodiments. Similar to FIG. 3B, when A-1 read is requested again, as is the case with the second A-1, data is already uploaded to the tiny read cache, so data may be transmitted to the host without NAND operation. Here, the data 716 for A-1 from the first buffer 714 may be returned to the host 702, along the path labelled 1, 2 and 3, after the controller determines (722) that the data for A-1 is in the first buffer 314.

Figure 7C:
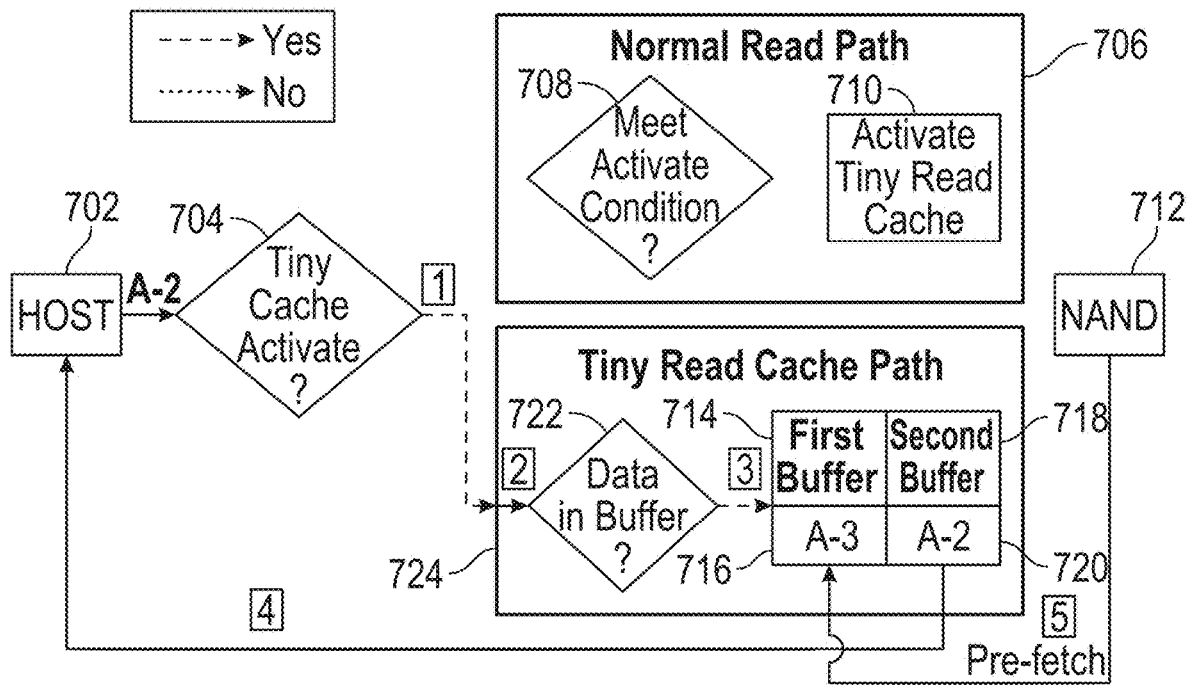

FIG. 7C shows read command handling for a first A-2 after repetitive A-1 access (as described above in reference to FIGS. 7A and 7B), according to one or more embodiments. This example is also similar to the one described above in reference to FIG. 3C. When A-2 read is requested by the host 702, tiny cache may be in the activated state (path labeled 1), data for A-2 may be determined (722) to be in the second buffer 718 (along path labelled 3). So the data 720 may be transferred to the host 702 without NAND operation because the data has already been pre-fetched, and A-3 data 728 is pre-fetched to the buffer 714 at the same time.

Figure 7D:
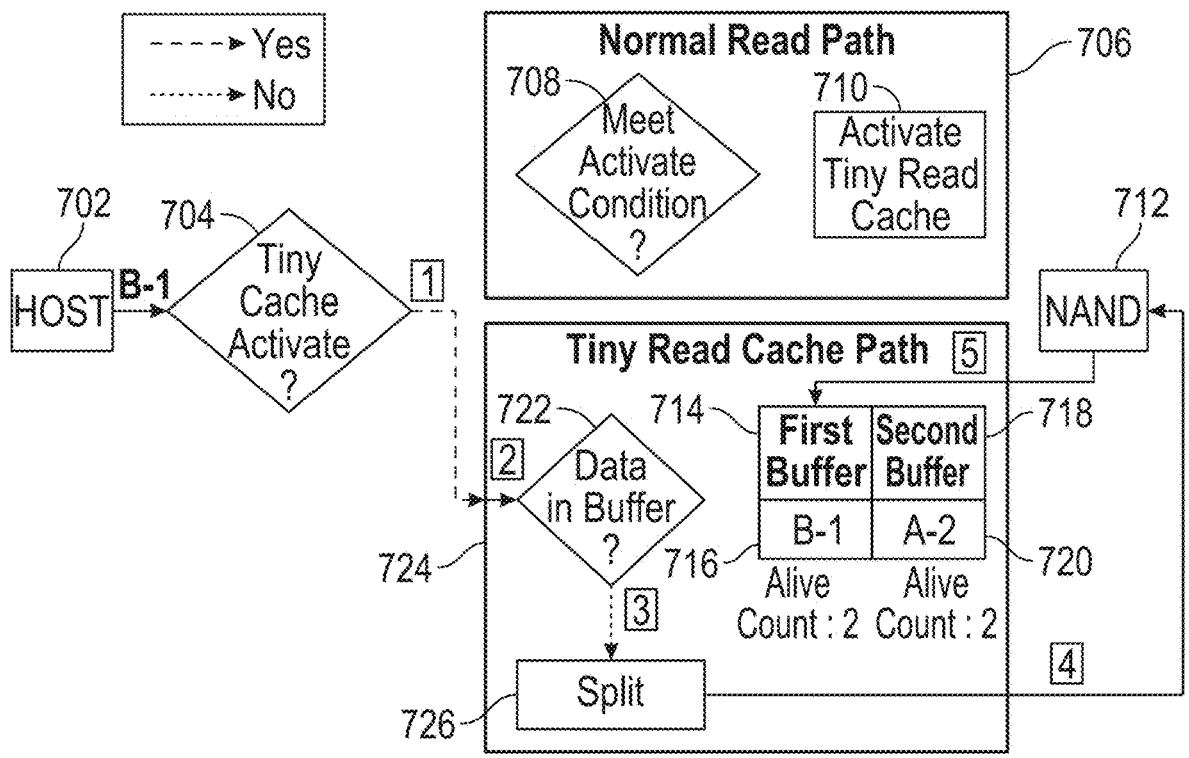

FIG. 7D shows read command handling for B-1, according to one or more embodiments. When the host 702 requests to read B-1 of stream B, the tiny read cache may be in an activated state (paths labelled 1 and 2). But data for stream B is not in the buffers 714 and 718. Unlike the example described above in reference to FIG. 3D, here, the controller 101 using the enhanced algorithm, may retrieve and place the currently requested B-1 data in the 4 KB buffer 714 used for prefetch, instead of de-activating the tiny read cache. Each separate buffer may be given an alive count (initial value may be 2 or a predetermined number obtained based on workload analysis).

Figure 7E:
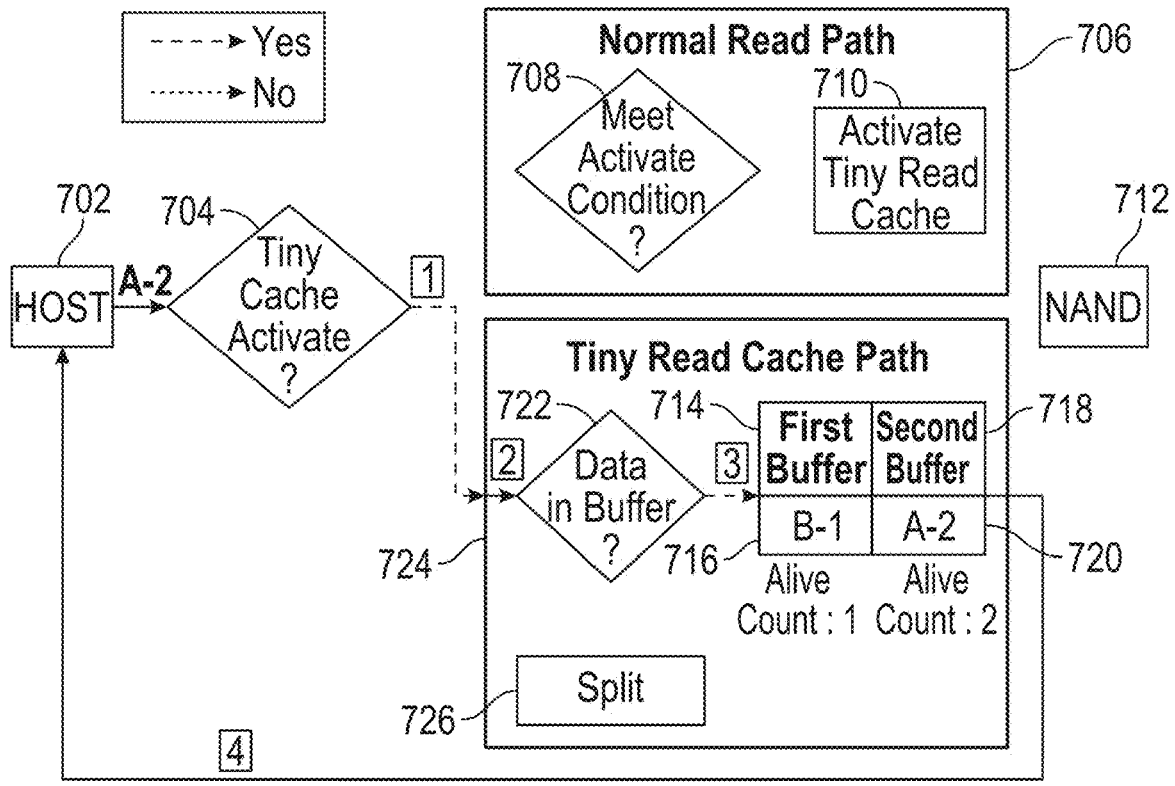

FIG. 7E shows read command handling for A-2, according to one or more embodiments. This example corresponds to an instance when the host 702 returns to stream A again and requests A-2. The alive count of the buffer 714 containing B-1 data of stream B may be decreased by 1. The requested data (A-2) may be transmitted from the second buffer 718.

Figure 7F:
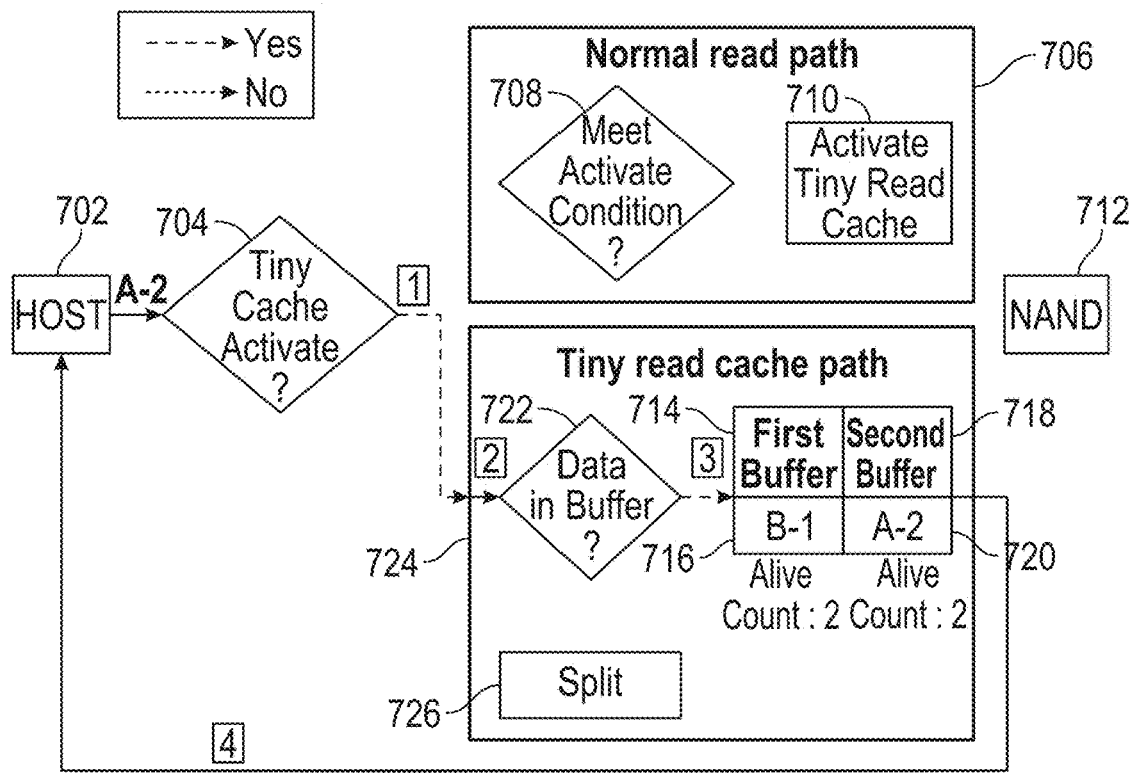

FIG. 7F shows following A-2 read handling, according to one or more embodiments. When the host 702 requests A-2 read again, the alive count of the buffer 714 containing B-1 data of stream B may be decreased by 1 and becomes 0. The requested data (A-2) is transmitted from the second buffer 718.

Figure 7G:
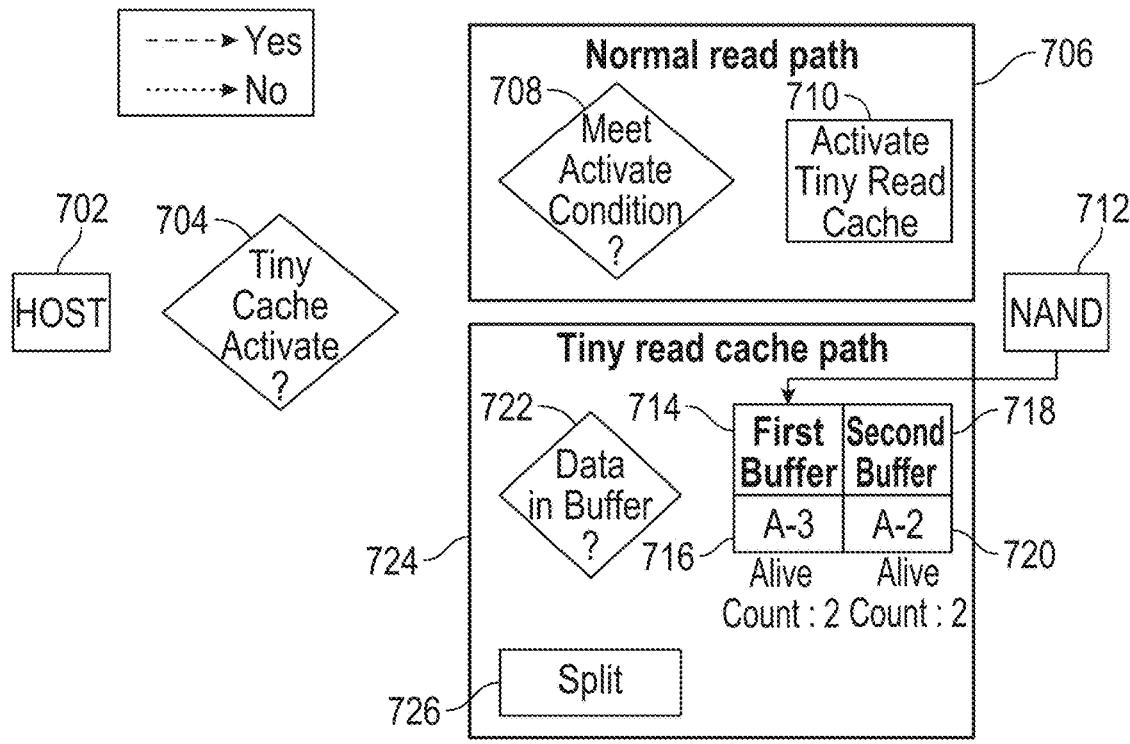

FIG. 7G shows split buffer state returned to normal buffer state, according to one or more embodiments. Because the alive count of stream B becomes 0 (shown in FIG. 7B), the buffer may be returned to the normal state. The first buffer 714 that had B-1 data of stream B may be filled with prefetched data (A-3) of stream A.

In this way, the enhanced algorithm (as illustrated, for example, in connection with FIGS. 4A-4B, 5, 6, and 7A-7G) supports the maintenance of tiny read cache activation state even when two streams are accessed at the same time even though it is unknown which stream will be continuously accessed. The enhanced algorithm lowers the probability of tiny read cache misses and, as a result, improves performance.

Figure 8:
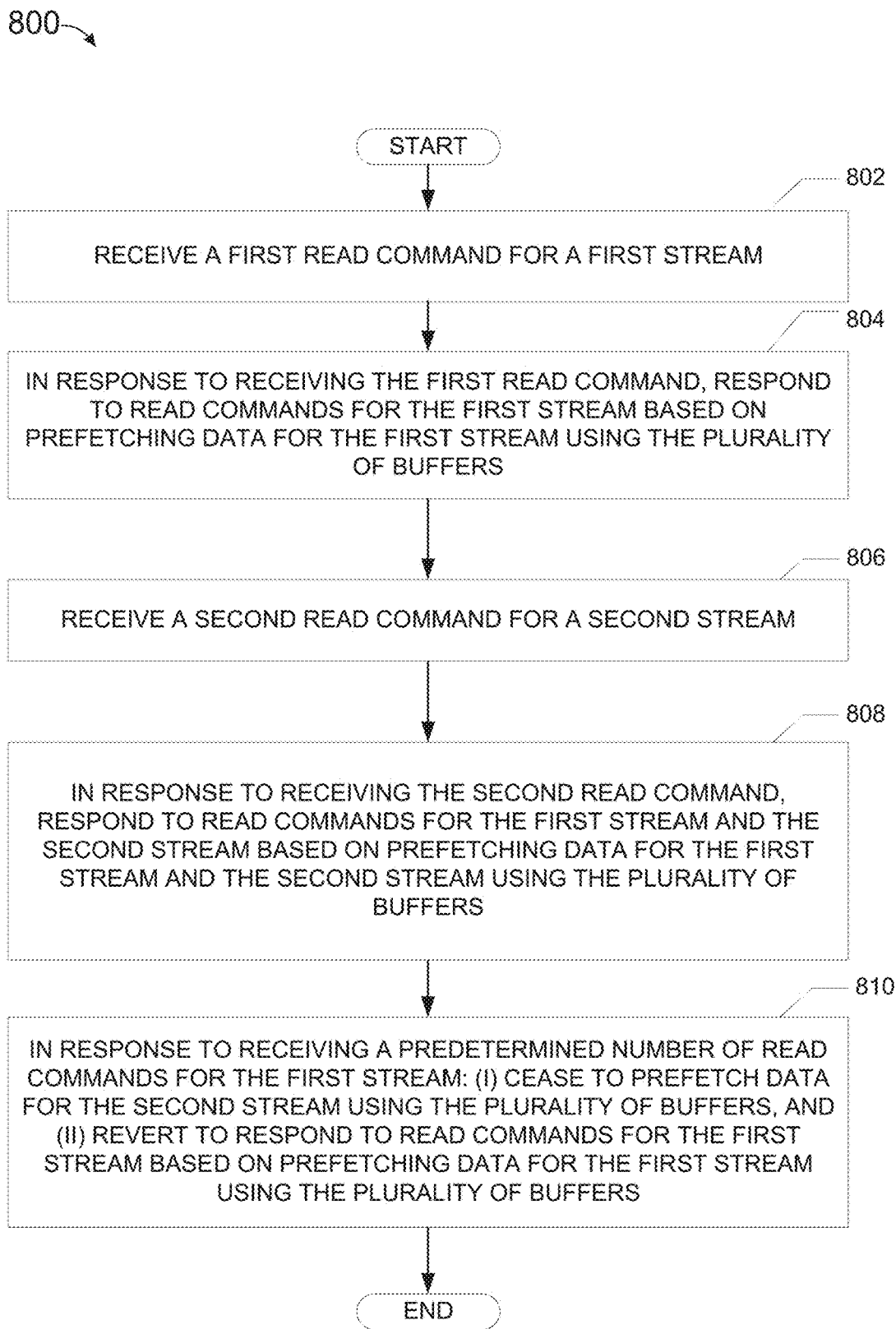
FIG. 8 is a flowchart illustrating an example process for an enhanced read cache algorithm for stream switching in a storage device, according to one or more embodiments.

It may be instructive to describe the structures shown in FIGS. 1, 2, 4A-4B, 5, 6, and 7A-7G, with respect to FIG. 8, a flowchart illustrating an example process 800 for an enhanced read cache algorithm for stream switching in a storage device, according to one or more embodiments. One or more blocks of FIG. 8 may be executed by a computing system (including, e.g., a controller of a flash memory, a data storage controller of a data storage system or a solid state storage device (SSD), a processor, or the like). Example of a computing system or a controller may be the controller 101. Similarly, a non-transitory machine-readable medium may include machine-executable instructions thereon that, when executed by a computer or machine, perform the blocks of FIG. 8. The steps of process 800 may be implemented as hardware, firmware, software, or a combination thereof. For example, a data storage device (e.g., the storage device 100) may include a submission queue for receiving host commands from a host system. The data storage device also includes a controller (e.g., the controller 101). The data storage device may also include a read cache including a plurality of buffers. Each buffer may be configured to store data prefetched from a device memory for a stream of a plurality of streams.

The controller 101 may be configured to receive (802) a first read command for a first stream. In response to receiving the first read command, the controller 101 may be configured to respond (804) to read commands for the first stream based on prefetching data for the first stream using the plurality of buffers. The controller 101 may be configured to receive (806) a second read command for a second stream. In response to receiving the second read command, the controller may be configured to respond (808) to read commands for the first stream and the second stream based on prefetching data for the first stream and the second stream using the plurality of buffers. After receiving the second read command for the second stream, in response to receiving a predetermined number of read commands for the first stream, the controller may be configured to (810): (i) cease to prefetch data for the second stream using the plurality of buffers, and (ii) revert to respond to read commands for the first stream based on prefetching data for the first stream using the plurality of buffers. Prefetching data may include loading data from a NAND array to a buffer in response to a read command for the data (e.g., loading A-1 into the first buffer in FIG. 7A).

In some aspects, in response to receiving the second read command, the controller 101 may be configured to: split the plurality of buffers to operate in a split buffer state, wherein the split buffer state allows or provides associating each buffer of the plurality of buffers with a corresponding stream so that at least one buffer of the plurality of buffers is assigned to the first stream and at least another buffer of the plurality of buffers is assigned to the second stream at the same time. Examples for splitting the buffer and the split buffer state are described above in reference to FIGS. 4A, 4B, 5, 6, and 7A-7G, according to one or more embodiments.

In some aspects, the controller 101 may be configured to: in response to receiving the first read command: initially operate the plurality of buffers in a normal state for the first stream, including (i) prefetching data for the first stream using the plurality of buffers and (ii) responding to read commands for the first stream using prefetched data for the first stream.

In some aspects, the controller 101 may be configured to: in response to receiving the second read command: split the plurality of buffers to operate in a split buffer state. The split buffer state allows or provides (i) associating each buffer of the plurality of buffers with a corresponding stream so that at least one buffer of the plurality of buffers is assigned to the first stream and at least another buffer of the plurality of buffers is assigned to the second stream at the same time, (ii) prefetching data for the first stream using the at least one buffer of the plurality of buffers and prefetching data for the second stream using the at least another buffer of the plurality of buffers, (iii) responding to a read command for the first stream using prefetched data for the first stream and the at least one buffer, and responding to a read command for the second stream using prefetched data for the second stream and the at least another buffer, and (iv) updating alive counts for the plurality of buffers based on one or more read commands for the first stream and the second stream, wherein the at least one buffer is separate and different from the at least another buffer.

In some aspects, the controller 101 may be configured to, when the alive count for a buffer corresponding to a stream reaches a zero value, revert to operate the plurality of buffers in the normal state for another stream of the plurality of streams, including (i) prefetching data for the another stream using the plurality of buffers and (ii) responding to read commands for the another stream using prefetched data for the another stream.

In some aspects, the controller 101 may be configured to update the alive count for each buffer by initially setting each alive count to a predetermined maximum value and subsequently decreasing the alive count for a respective buffer each time any read command does not correspond to a stream corresponding to the respective buffer.

In some aspects, the predetermined maximum value for alive counts is the predetermined number of read commands.

In some aspects, the controller 101 may be configured to: in response to receiving the first read command: (i) detect if the first read command corresponds to a first logical address for the first stream, and (ii) in response to detecting that the first read command corresponds to the first logical address for the first stream, start responding to read commands for the first stream based on prefetching data for the first stream using the plurality of buffers; and in response to receiving the second read command: (i) detect if the second read command corresponds to a first logical address for the second stream, and (ii) in response to detecting that the second read command corresponds to the first logical address for the second stream, start responding to read commands for the first stream and the second stream based on prefetching data for the first stream and the second stream using the plurality of buffers.

In some aspects, the controller 101 may be configured to: in response to receiving the first read command: (i) detect if the first read command corresponds to a first 4 kilobytes (KB) for the first stream and corresponds to a 4 KB aligned logical block address, and (ii) in response to detecting that the first read command corresponds to the first 4 KB for the first stream and corresponds to the 4 KB aligned logical block address, start responding to read commands for the first stream based on prefetching data for the first stream using the plurality of buffers; and in response to receiving the second read command: (i) detect if the second read command corresponds to a first 4 KB for the second stream and corresponds to a 4 KB aligned logical block address, and (ii) in response to detecting that the second read command corresponds to the first 4 KB for the second stream and corresponds to the 4 KB aligned logical block address, start responding to read commands for the first stream and the second stream based on prefetching data for the first stream and the second stream using the plurality of buffers.

In some aspects, the controller 101 may be configured to: in response to receiving the first read command, use one buffer of the plurality of buffers to store a first 4 KB of data requested by the host system and use another buffer of the plurality of buffers to prefetch next 4 KB of data.

Various examples of aspects of the disclosure are described below. These are provided as examples, and do not limit the subject technology.

One or more aspects of the subject technology provide a data storage device that may include a host interface, a device memory, a read cache, and a controller. The host interface may couple the data storage device to a host system. The read cache may include a plurality of buffers, each buffer configured to store data prefetched from the device memory for a stream of a plurality of streams. The controller may be configured to: receive a first read command for a first stream, in response to receiving the first read command; respond to read commands for the first stream based on prefetching data for the first stream using the plurality of buffers; receive a second read command for a second stream; in response to receiving the second read command, respond to read commands for the first stream and the second stream based on prefetching data for the first stream and the second stream using the plurality of buffers; and after receiving the second read command for the second stream, in response to receiving a predetermined number of read commands for the first stream: (i) cease to prefetch data for the second stream using the plurality of buffers, and (ii) revert to respond to read commands for the first stream based on prefetching data for the first stream using the plurality of buffers.

In some aspects, in response to receiving the second read command, the controller may be configured to: split the plurality of buffers to operate in a split buffer state. The split buffer state may allow or provide associating each buffer of the plurality of buffers with a corresponding stream so that at least one buffer of the plurality of buffers may be assigned to the first stream and at least another buffer of the plurality of buffers may be assigned to the second stream at the same time.

In some aspects, the controller may be configured to: in response to receiving the first read command: initially operate the plurality of buffers in a normal state for the first stream, including (i) prefetching data for the first stream using the plurality of buffers and (ii) responding to read commands for the first stream using prefetched data for the first stream.

In some aspects, the controller may be configured to: in response to receiving the second read command: split the plurality of buffers to operate in a split buffer state, wherein the split buffer state may allow or provide (i) associating each buffer of the plurality of buffers with a corresponding stream so that at least one buffer of the plurality of buffers is assigned to the first stream and at least another buffer of the plurality of buffers is assigned to the second stream at the same time, (ii) prefetching data for the first stream using the at least one buffer of the plurality of buffers and prefetching data for the second stream using the at least another buffer of the plurality of buffers, (iii) responding to a read command for the first stream using prefetched data for the first stream and the at least one buffer, and responding to a read command for the second stream using prefetched data for the second stream and the at least another buffer, and (iv) updating alive counts for the plurality of buffers based on one or more read commands for the first stream and the second stream, wherein the at least one buffer is separate and different from the at least another buffer.

In some aspects, the controller may be configured to: when the alive count for a buffer corresponding to a stream reaches a zero value, revert to operate the plurality of buffers in the normal state for another stream of the plurality of streams, including (i) prefetching data for the another stream using the plurality of buffers and (ii) responding to read commands for the another stream using prefetched data for the another stream.

In some aspects, the controller may be configured to: update the alive count for each buffer by initially setting each alive count to a predetermined maximum value and subsequently decreasing the alive count for a respective buffer each time any read command does not correspond to a stream corresponding to the respective buffer.

In some aspects, the predetermined maximum value for alive counts is the predetermined number of read commands.

In some aspects, the controller may be configured to: in response to receiving the first read command: (i) detect if the first read command corresponds to a first logical address for the first stream, and (ii) in response to detecting that the first read command corresponds to the first logical address for the first stream, start responding to read commands for the first stream based on prefetching data for the first stream using the plurality of buffers; and in response to receiving the second read command: (i) detect if the second read command corresponds to a first logical address for the second stream, and (ii) in response to detecting that the second read command corresponds to the first logical address for the second stream, start responding to read commands for the first stream and the second stream based on prefetching data for the first stream and the second stream using the plurality of buffers.

In some aspects, the controller may be configured to: in response to receiving the first read command: (i) detect if the first read command corresponds to a first 4 kilobytes (KB) for the first stream and corresponds to a 4 KB aligned logical block address, and (ii) in response to detecting that the first read command corresponds to the first 4 KB for the first stream and corresponds to the 4 KB aligned logical block address, start responding to read commands for the first stream based on prefetching data for the first stream using the plurality of buffers; and in response to receiving the second read command: (i) detect if the second read command corresponds to a first 4 KB for the second stream and corresponds to a 4 KB aligned logical block address, and (ii) in response to detecting that the second read command corresponds to the first 4 KB for the second stream and corresponds to the 4 KB aligned logical block address, start responding to read commands for the first stream and the second stream based on prefetching data for the first stream and the second stream using the plurality of buffers.

In some aspects, the controller may be configured to: in response to receiving the first read command, use one buffer of the plurality of buffers to store a first 4 KB of data requested by the host system and use another buffer of the plurality of buffers to prefetch next 4 KB of data.

In another aspect, a method is provided. The method may be implemented using one or more controllers for one or more data storage devices. The method may include: receiving a first read command for a first stream; in response to receiving the first read command, responding to read commands for the first stream based on prefetching data for the first stream using a plurality of buffers; receiving a second read command for a second stream; in response to receiving the second read command, responding to read commands for the first stream and the second stream based on prefetching data for the first stream and the second stream using the plurality of buffers; and after receiving the second read command for the second stream, in response to receiving a predetermined number of read commands for the first stream: (i) ceasing to prefetch data for the second stream using the plurality of buffers, and (ii) reverting to respond to read commands for the first stream based on prefetching data for the first stream using the plurality of buffers.

In some aspects, the method may further include: in response to receiving the second read command, splitting the plurality of buffers to operate in a split buffer state, wherein the split buffer state allows or provides associating each buffer of the plurality of buffers with a corresponding stream so that at least one buffer of the plurality of buffers is assigned to the first stream and at least another buffer of the plurality of buffers is assigned to the second stream at the same time.

In some aspects, the method may further include: in response to receiving the first read command: initially operating the plurality of buffers in a normal state for the first stream, including (i) prefetching data for the first stream using the plurality of buffers and (ii) responding to read commands for the first stream using prefetched data for the first stream.

In some aspects, the method may further include: in response to receiving the second read command: splitting the plurality of buffers to operate in a split buffer state, wherein the split buffer state allows or provides (i) associating each buffer of the plurality of buffers with a corresponding stream so that at least one buffer of the plurality of buffers is assigned to the first stream and at least another buffer of the plurality of buffers is assigned to the second stream at the same time, (ii) prefetching data for the first stream using the at least one buffer of the plurality of buffers and prefetching data for the second stream using the at least another buffer of the plurality of buffers, (iii) responding to a read command for the first stream using prefetched data for the first stream and the at least one buffer, and responding to a read command for the second stream using prefetched data for the second stream and the at least another buffer, and (iv) updating alive counts for the plurality of buffers based on one or more read commands for the first stream and the second stream, wherein the at least one buffer is separate and different from the at least another buffer.

In some aspects, the method may further include: when the alive count for a buffer corresponding to a stream reaches a zero value, reverting to operate the plurality of buffers in the normal state for another stream of the plurality of streams, including (i) prefetching data for the another stream using the plurality of buffers and (ii) responding to read commands for the another stream using prefetched data for the another stream.

In some aspects, the method may further include: updating the alive count for each buffer by initially setting each alive count to a predetermined maximum value and subsequently decreasing the alive count for a respective buffer each time any read command does not correspond to a stream corresponding to the respective buffer.

In some aspects, the predetermined maximum value for alive counts is the predetermined number of read commands.

In some aspects, the method may further include: in response to receiving the first read command: (i) detecting if the first read command corresponds to a first logical address for the first stream, and (ii) in response to detecting that the first read command corresponds to the first logical address for the first stream, starting to respond to read commands for the first stream based on prefetching data for the first stream using the plurality of buffers; and in response to receiving the second read command: (i) detecting if the second read command corresponds to a first logical address for the second stream, and (ii) in response to detecting that the second read command corresponds to the first logical address for the second stream, starting to respond to read commands for the first stream and the second stream based on prefetching data for the first stream and the second stream using the plurality of buffers.

In some aspects, the method may further include: in response to receiving the first read command: (i) detecting if the first read command corresponds to a first 4 kilobytes (KB) for the first stream and corresponds to a 4 KB aligned logical block address, and (ii) in response to detecting that the first read command corresponds to the first 4 KB for the first stream and corresponds to the 4 KB aligned logical block address, starting to respond to read commands for the first stream based on prefetching data for the first stream using the plurality of buffers; and in response to receiving the second read command: (i) detecting if the second read command corresponds to a first 4 KB for the second stream and corresponds to a 4 KB aligned logical block address, and (ii) in response to detecting that the second read command corresponds to the first 4 KB for the second stream and corresponds to the 4 KB aligned logical block address, starting to respond to read commands for the first stream and the second stream based on prefetching data for the first stream and the second stream using the plurality of buffers.

In another aspect, a system may include: means for receiving a first read command for a first stream; means for, in response to receiving the first read command, responding to read commands for the first stream based on prefetching data for the first stream using a plurality of buffers; means for receiving a second read command for a second stream; means for, in response to receiving the second read command, responding to read commands for the first stream and the second stream based on prefetching data for the first stream and the second stream using the plurality of buffers; and means for, after receiving the second read command for the second stream, in response to receiving a predetermined number of read commands for the first stream: (i) ceasing to prefetch data for the second stream using the plurality of buffers, and (ii) reverting to respond to read commands for the first stream based on prefetching data for the first stream using the plurality of buffers.

In another aspect, a data storage device may include a host interface for coupling the data storage device to a host system, a device memory, a read cache including a plurality of buffers, and a controller. Each buffer may be configured to store data prefetched from the device memory for a stream of a plurality of streams of data, and each buffer may be associated with a corresponding alive count. The controller may be configured to: receive, from the host system via the host interface, a first read command for a first logical block address corresponding to a first stream of data; in response to receiving the first read command: in accordance with a determination that a first buffer of the plurality of buffers contains data for the first logical block address: in accordance with a determination that a second buffer of the plurality of buffers (i) does not contain data corresponding to a second stream of data or (ii) contains data corresponding to the second stream of data and is associated with a corresponding alive count of a zero value, prefetch data for a second logical block address corresponding to the first stream of data, to the second buffer; and in accordance with a determination that the second buffer of the plurality of buffers (i) contains data corresponding to the second stream of data and (ii) is associated with a corresponding alive count of a non-zero value, decrease the corresponding alive count; in accordance with a determination that the plurality of buffers does not contain data for the first stream of data: prefetch data for the first logical block address to the first buffer; and set a predetermined maximum value to the respective alive count for each buffer of the plurality of buffers; and respond to the host system with the data for the first logical block address.

Disclosed are systems and methods providing enhanced read cache for stream switching in storage devices. Thus, the described methods and systems provide performance benefits that improve the functioning of a storage device.

It is understood that other configurations of the subject technology will become readily apparent to those skilled in the art from the detailed description herein, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A data storage device, comprising:
   a host interface for coupling the data storage device to a host system;
   a device memory;
   a normal read path;
   a read cache path;
   a read cache in the read cache path, the read cache including a plurality of buffers, each buffer configured to store data prefetched from the device memory for a stream of a plurality of streams; and
   a controller configured to:
      receive a first read command for a first stream;
      in response to receiving the first read command, respond to read commands for the first stream based on prefetching data for the first stream using the plurality of buffers;
      receive a second read command for a second stream;
      in response to receiving the second read command, respond to read commands for the first stream and the second stream based on prefetching data for the first stream and the second stream using the plurality of buffers; and
      after receiving the second read command for the second stream, in response to receiving a predetermined number of read commands for the first stream: (i) cease to prefetch data for the second stream using the plurality of buffers, and (ii) revert to respond to read commands for the first stream based on prefetching data for the first stream using the plurality of buffers,
      wherein in response to receiving the first read command, the controller is configured to determine whether the read cache is in a de-activation state,
      wherein when the read cache is in the de-activation state, the first read command follows the normal read path, and the controller is configured to determine conditions including whether the first read command is for memory access of a first unit of the first stream, of a predetermined size, and of a predetermined aligned logical block address,
      wherein when all of the conditions are satisfied, the controller is configured to perform operations including activating the read cache in the read cache path, prefetching and loading the first unit into a first buffer, and prefetching and loading a second unit of the first stream into a second buffer,
      wherein when the memory access is not for the first unit of the first stream, the controller is prevented from performing the operations, and
      wherein the plurality of buffers include the first and second buffers.

2. The data storage device of claim 1, wherein in response to receiving the second read command, the controller is configured to: split the plurality of buffers to operate in a split buffer state, wherein the split buffer state allows or provides associating each buffer of the plurality of buffers with a corresponding stream so that at least one buffer of the plurality of buffers is assigned to the first stream and at least another buffer of the plurality of buffers is assigned to the second stream at the same time.

3. The data storage device of claim 1, wherein the controller is configured to:
   in response to receiving the first read command:
      initially operate the plurality of buffers in a normal state for the first stream, including (i) prefetching data for the first stream using the plurality of buffers and (ii) responding to read commands for the first stream using prefetched data for the first stream.

4. The data storage device of claim 3, wherein the controller is configured to:
   in response to receiving the second read command:
      split the plurality of buffers to operate in a split buffer state, wherein the split buffer state allows or provides (i) associating each buffer of the plurality of buffers with a corresponding stream so that at least one buffer of the plurality of buffers is assigned to the first stream and at least another buffer of the plurality of buffers is assigned to the second stream at the same time, (ii) prefetching data for the first stream using the at least one buffer of the plurality of buffers and prefetching data for the second stream using the at least another buffer of the plurality of buffers, (iii) responding to a read command for the first stream using prefetched data for the first stream and the at least one buffer, and responding to a read command for the second stream using prefetched data for the second stream and the at least another buffer, and (iv) updating alive counts for the plurality of buffers based on one or more read commands for the first stream and the second stream, wherein the at least one buffer is separate and different from the at least another buffer.

5. The data storage device of claim 4, wherein the controller is configured to:
   when the alive count for a buffer corresponding to a stream reaches a zero value, revert to operate the plurality of buffers in the normal state for another stream of the plurality of streams, including (i) prefetching data for the another stream using the plurality of buffers and (ii) responding to read commands for the another stream using prefetched data for the another stream.

6. The data storage device of claim 4, wherein the controller is configured to:
   update the alive count for each buffer by initially setting each alive count to a predetermined maximum value and subsequently decreasing the alive count for a respective buffer each time any read command does not correspond to a stream corresponding to the respective buffer.

7. The data storage device of claim 6, wherein the predetermined maximum value for alive counts is the predetermined number of read commands, and
wherein the controller is configured to: in response to receiving the first read command, use one buffer of the plurality of buffers to store a first 4 kilobytes (KB) of data requested by the host system and use another buffer of the plurality of buffers to prefetch next 4 KB of data.

8. The data storage device of claim 1, wherein the controller is configured to:
in response to receiving the first read command: (i) detect if the first read command corresponds to a first logical address for the first stream, and (ii) in response to detecting that the first read command corresponds to the first logical address for the first stream, start responding to read commands for the first stream based on prefetching data for the first stream using the plurality of buffers; and
in response to receiving the second read command: (i) detect if the second read command corresponds to a first logical address for the second stream, and (ii) in response to detecting that the second read command corresponds to the first logical address for the second stream, start responding to read commands for the first stream and the second stream based on prefetching data for the first stream and the second stream using the plurality of buffers.

9. The data storage device of claim 1, wherein the controller is configured to:
in response to receiving the first read command: (i) detect if the first read command corresponds to a first 4 kilobytes (KB) for the first stream and corresponds to a 4 KB aligned logical block address, and (ii) in response to detecting that the first read command corresponds to the first 4 KB for the first stream and corresponds to the 4 KB aligned logical block address, start responding to read commands for the first stream based on prefetching data for the first stream using the plurality of buffers; and
in response to receiving the second read command: (i) detect if the second read command corresponds to a first 4 KB for the second stream and corresponds to a 4 KB aligned logical block address, and (ii) in response to detecting that the second read command corresponds to the first 4 KB for the second stream and corresponds to the 4 KB aligned logical block address, start responding to read commands for the first stream and the second stream based on prefetching data for the first stream and the second stream using the plurality of buffers.

10. The data storage device of claim 1, when the read cache is in an activated state, in response to receiving the second read command:
the controller is configured to determine whether data for the second stream is present in the plurality of buffers; and
if the data for the second stream is not present in the plurality of buffers, then
the controller is prevented from de-activating the read cache in the read cache path and is prevented from using the normal read path to transfer the data for the second stream from the device memory to the host system,
the controller is configured to prefetch and load the data for the second stream into one of the first and second buffers, and is prevented from prefetching and loading other data from the second stream into the other of the first and second buffers, and
the first or second unit of the first stream remains in the other of the first and second buffers.

11. A method implemented using one or more controllers for one or more data storage devices, the method comprising:
receiving a first read command for a first stream;
in response to receiving the first read command, responding to read commands for the first stream based on prefetching data for the first stream using a plurality of buffers;
receiving a second read command for a second stream;
in response to receiving the second read command, responding to read commands for the first stream and the second stream based on prefetching data for the first stream and the second stream using the plurality of buffers; and
after receiving the second read command for the second stream, in response to receiving a predetermined number of read commands for the first stream: (i) ceasing to prefetch data for the second stream using the plurality of buffers, and (ii) reverting to respond to read commands for the first stream based on prefetching data for the first stream using the plurality of buffers, wherein the one or more data storage devices comprise:
a normal read path;
a read cache path; and
a read cache in the read cache path, the read cache including the plurality of buffers,
wherein the method comprises, in response to receiving the first read command, determining whether the read cache is in a de-activation state,
wherein when the read cache is in the de-activation state, the method comprises: having the first read command follow the normal read path; and determining conditions including whether the first read command is for memory access of a first unit of the first stream, of a predetermined size, and of a predetermined aligned logical block address,
wherein when all of the conditions are satisfied, the method comprises: performing operations including activating the read cache in the read cache path; prefetching and loading the first unit into a first buffer; and prefetching and loading a second unit of the first stream into a second buffer,
wherein when the memory access is not for the first unit of the first stream, the method comprises being prevented from performing the operations, and
wherein the plurality of buffers include the first and second buffers.

12. The method of claim 11, further comprising:
in response to receiving the second read command, splitting the plurality of buffers to operate in a split buffer state, wherein the split buffer state allows or provides associating each buffer of the plurality of buffers with a corresponding stream so that at least one buffer of the plurality of buffers is assigned to the first stream and at least another buffer of the plurality of buffers is assigned to the second stream at the same time.

13. The method of claim 11, further comprising:
in response to receiving the first read command:
initially operating the plurality of buffers in a normal state for the first stream, including (i) prefetching data for the first stream using the plurality of buffers and (ii) responding to read commands for the first stream using prefetched data for the first stream.

14. The method of claim 13, further comprising:
in response to receiving the second read command:
splitting the plurality of buffers to operate in a split buffer state, wherein the split buffer state allows or provides (i) associating each buffer of the plurality of buffers with a corresponding stream so that at least one buffer of the plurality of buffers is assigned to the first stream and at least another buffer of the plurality of buffers is assigned to the second stream at the same time, (ii) prefetching data for the first stream using the at least one buffer of the plurality of buffers and prefetching data for the second stream using the at least another buffer of the plurality of buffers, (iii) responding to a read command for the first stream using prefetched data for the first stream and the at least one buffer, and responding to a read command for the second stream using prefetched data for the second stream and the at least another buffer, and (iv) updating alive counts for the plurality of buffers based on one or more read commands for the first stream and the second stream, wherein the at least one buffer is separate and different from the at least another buffer.

15. The method of claim 14, further comprising:
when the alive count for a buffer corresponding to a stream reaches a zero value, reverting to operate the plurality of buffers in the normal state for another stream of a plurality of streams, including (i) prefetching data for the another stream using the plurality of buffers and (ii) responding to read commands for the another stream using prefetched data for the another stream.

16. The method of claim 14, further comprising:
updating the alive count for each buffer by initially setting each alive count to a predetermined maximum value and subsequently decreasing the alive count for a respective buffer each time any read command does not correspond to a stream corresponding to the respective buffer.

17. The method of claim 16, wherein the predetermined maximum value for alive counts is the predetermined number of read commands.

18. The method of claim 11, further comprising:
in response to receiving the first read command: (i) detecting if the first read command corresponds to a first logical address for the first stream, and (ii) in response to detecting that the first read command corresponds to the first logical address for the first stream, starting to respond to read commands for the first stream based on prefetching data for the first stream using the plurality of buffers; and
in response to receiving the second read command: (i) detecting if the second read command corresponds to a first logical address for the second stream, and (ii) in response to detecting that the second read command corresponds to the first logical address for the second stream, starting to respond to read commands for the first stream and the second stream based on prefetching data for the first stream and the second stream using the plurality of buffers.

19. The method of claim 11, further comprising:
in response to receiving the first read command: (i) detecting if the first read command corresponds to a first 4 kilobytes (KB) for the first stream and corresponds to a 4 KB aligned logical block address, and (ii) in response to detecting that the first read command corresponds to the first 4 KB for the first stream and corresponds to the 4 KB aligned logical block address, starting to respond to read commands for the first stream based on prefetching data for the first stream using the plurality of buffers; and
in response to receiving the second read command: (i) detecting if the second read command corresponds to a first 4 KB for the second stream and corresponds to a 4 KB aligned logical block address, and (ii) in response to detecting that the second read command corresponds to the first 4 KB for the second stream and corresponds to the 4 KB aligned logical block address, starting to respond to read commands for the first stream and the second stream based on prefetching data for the first stream and the second stream using the plurality of buffers.

20. A system, comprising:
a normal read path;
a read cache path;
a read cache in the read cache path, the read cache including a plurality of buffers;
means for receiving a first read command for a first stream;
means for, in response to receiving the first read command, responding to read commands for the first stream based on prefetching data for the first stream using the plurality of buffers;
means for receiving a second read command for a second stream;
means for, in response to receiving the second read command, responding to read commands for the first stream and the second stream based on prefetching data for the first stream and the second stream using the plurality of buffers;
means for, after receiving the second read command for the second stream, in response to receiving a predetermined number of read commands for the first stream: (i) ceasing to prefetch data for the second stream using the plurality of buffers, and (ii) reverting to respond to read commands for the first stream based on prefetching data for the first stream using the plurality of buffers;
means for, in response to receiving the first read command, determining whether the read cache is in a de-activation state;
means for, when the read cache is in the de-activation state, having the first read command follow the normal read path, and determining conditions including whether the first read command is for memory access of a first unit of the first stream, of a predetermined size, and of a predetermined aligned logical block address;
means for, when all of the conditions are satisfied, performing operations including activating the read cache in the read cache path, prefetching and loading the first unit into a first buffer, and prefetching and loading a second unit of the first stream into a second buffer; and
means for, when the memory access is not for the first unit of the first stream, being prevented from performing the operations,
wherein the plurality of buffers include the first and second buffers.

* * * * *